(12) United States Patent
Chou et al.

(10) Patent No.: US 7,197,491 B1
(45) Date of Patent: *Mar. 27, 2007

(54) ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES

(75) Inventors: Kehsing J. Chou, San Jose, CA (US); Mei-Ing W. Huang, San Jose, CA (US); Taejae Lee, Cupertino, CA (US); Basuki N. Soetarman, Los Gatos, CA (US); Robert Nelson Summers, San Jose, CA (US); Mimi Phuong-Thao Vo, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 09/399,696

(22) Filed: Sep. 21, 1999

(51) Int. Cl.
*G06F 17/30* (2006.01)

(52) U.S. Cl. .................. 707/2; 707/1; 707/3; 707/10

(58) Field of Classification Search ............... 707/103, 707/104.1, 5, 3, 514, 2, 10, 1; 709/203
See application file for complete search history.

(56) References Cited

U.S. PATENT DOCUMENTS

| | | | |
|---|---|---|---|
| 4,525,803 A | 6/1985 | Vidalin et al. | 364/900 |
| 4,646,061 A | 2/1987 | Bledsoe | 340/347 |
| 5,202,981 A | 4/1993 | Shackelford | 395/600 |
| 5,303,342 A | 4/1994 | Edge | 395/164 |
| 5,317,736 A | 5/1994 | Bowen | 395/600 |
| 5,355,493 A | 10/1994 | Silberbauer et al. | 395/700 |
| 5,668,986 A * | 9/1997 | Nilsen et al. | |
| 5,708,828 A | 1/1998 | Coleman | 395/785 |
| 5,721,904 A * | 2/1998 | Ito et al. | 707/8 |
| 5,742,806 A | 4/1998 | Reiner et al. | 395/600 |
| 5,745,906 A | 4/1998 | Squibb | 707/203 |
| 5,752,252 A | 5/1998 | Zbikowski et al. | 707/205 |
| 5,774,668 A * | 6/1998 | Choquier et al. | 709/223 |
| 5,774,888 A | 6/1998 | Light | 707/5 |
| 5,864,866 A | 1/1999 | Henckel et al. | 707/103 |
| 5,884,303 A | 3/1999 | Brown | 707/3 |
| 5,893,119 A | 4/1999 | Squibb | 707/203 |
| 5,903,894 A | 5/1999 | Reneris | 707/100 |
| 6,259,705 B1 * | 7/2001 | Takahashi et al. | 370/465 |
| 6,272,488 B1 * | 8/2001 | Chang et al. | 707/4 |
| 6,324,580 B1 * | 11/2001 | Jindal et al. | 709/228 |
| 6,374,243 B1 * | 4/2002 | Kobayashi et al. | 707/8 |
| 6,446,070 B1 * | 9/2002 | Arnold et al. | 707/10 |
| 6,526,448 B1 * | 2/2003 | Blewett | 709/238 |
| 6,535,878 B1 * | 3/2003 | Guedalia et al. | 707/8 |
| 6,772,131 B1 * | 8/2004 | Francis et al. | 705/35 |

FOREIGN PATENT DOCUMENTS

EP        169389 A      1/1986

(Continued)

OTHER PUBLICATIONS

Chung-Min Chen, Performance comparison of three alternatives of distributed multidatabase system global query perspective, Feb. 16-18, 1998, Tempe/Phoeniz, AZ, USA 1998, pp. 53-59.*

(Continued)

*Primary Examiner*—Hung Pham
(74) *Attorney, Agent, or Firm*—Sughrue Mion, PLLC

(57) ABSTRACT

An architecture and implementation of a dynamic RMI server configuration hierarchy to support federated search and update across heterogeneous datastores. The RMI server configuration hierarchy supports searching for data in one or more heterogeneous data sources within a computer system. A request for data is received at a federated data source. Then, a server is selected to process the request based on a load of the server and based on whether the server can satisfy the request for data.

14 Claims, 9 Drawing Sheets

FOREIGN PATENT DOCUMENTS

| | | | |
|---|---|---|---|
| EP | 228213 | A | 7/1987 |
| EP | 532004 | A | 3/1993 |
| EP | 632364 | A | 1/1995 |
| EP | 632366 | A | 1/1995 |
| EP | 678986 | A | 10/1995 |
| EP | 711083 | A | 5/1996 |
| EP | 712257 | A | 5/1996 |
| EP | 755161 | A | 1/1997 |
| EP | 757333 | A | 2/1997 |
| EP | 0 838 771 | A2 | 4/1998 |
| EP | 0838 771 | A | 4/1998 |
| JP | 11122116 | A | 4/1998 |
| JP | 11075160 | A | 3/1999 |
| WO | WO 8802888 | A | 4/1988 |
| WO | WO 9617306 | A | 11/1995 |
| WO | WO 98 35480 | A | 8/1998 |

OTHER PUBLICATIONS

Microsoft Press, Microsoft Press Computer Dictionary, Copyright 1997, p. 430.*

Sun Microsystem, Java Remote Method Invocation Specification, copyright 1997-1998, <http://sunsite.nstu.nsk.su/java-stuff/JDK/guide/rmi/spec/rmiTOC.doc.html>.*

Sheth et al., "Federeated Database Systems for Managing Distributed, Heterogenous, and Autonomous Database", Sep. 1990, ACM Computing Surveys, pp. 183-236.*

Wikipedia, The Free Encyclopedia, Remote Procedure Call, <http://en.wikipedia.org/wiki/Remote_procedure_call>.*

Sun Microsystems, Java Remote Method Invocation, copyright 1997, <http: www.sbg.ac.at/docu/man/java/jdkdocs-1.2/guide/rmi/spec/rmitoc.doc.html>.*

"DB2 Universal Database Server for OS/390, version 6, DB2 Universal database Extenders", International Business Machines Corporation, pp. 1-8, May 1998.

"Information Intergration with IBM DB2 DataJoiner Version 2", White Paper, Data Management Solutions, International Business Corporation, First Edition Sep. 1997.

"Informix Datablade Technology", http://www.infomix.com/informix/products/options/udo/datablade/dbtech/overview.

"Informix Datablade Technology—To get to the top and stay there, your business must work smarter; you must think ahead and continuoulsy adapt to new market conditions and take advantage of new opportunities as they arise", http://www.informix.com/informix/products/options/udo/datablade/dbtech/ov.../db_intro.ht.

"Informix Datablade Technology—Informix Dynamic Server-Universal Data Option fast, Integrated-and Extensible", http://www.informix.com/informix/products/options/udo/datablade/dbtech/overview./body.htm.

"Informix Datablade Technology—Transforming Data into Smart Data", http://www.informix.com/informix/products/integration/datablade/datablade_ds.htm.

"Jini—Technology Executive Overview", Sun Microsystems, Inc. Jan. 1999 http://ww.sun.com/jini/overview/overview.pdf.

Oracle8i Data Cartridge Developer's Guide Release 8.1.5 A68002-01, Oracle Corporation, 1999.

"Jini—Connection Technology", Sun Microsystems, Inc. 1999 http://www.sun.com/jini.

Shatz, B. et al., "Federating diverse collections of scientific literature", Computer, vol. 29, No. 5 pp. 28-36, May 1996 (abstract).

Java Remote Method Invocation, printed from Sun Microsystems, Inc.'s web page (http://java.sun.com/products/jdk/rmi/) on May 6, 2005.

* cited by examiner

ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES

CROSS-REFERENCE TO RELATED APPLICATIONS

This application is related to the following co-pending and commonly-assigned patent applications:

application Ser. No. 09/400,532, entitled "MANAGING RESULTS OF FEDERATED SEARCHES ACROSS HETEROGENEOUS DATASTORES WITH A FEDERATED RESULT SET CURSOR OBJECT," filed on same date herewith, by Basuki N. Soertarman et al.;

application Ser. No. 09/400,638, entitled "THE DESIGN AND IMPLEMENTATION OF A CLIENT/SERVER FRAMEWORK FOR FEDERATED MULTI-SEARCH AND UPDATE ACROSS HETEROGENEOUS DATASTORES," filed on same date herewith, by Kehsing J. Chou et al.;

application Ser. No. 09/399,682, entitled "ARCHITECTURE TO ENABLE SEARCH GATEWAYS AS PART OF FEDERATED SEARCH," filed on same date herewith, by Kehsing J. Chou et al.;

application Ser. No. 09/399,697, entitled "DELAYED DELIVERY OF QUERY RESULTS OR OTHER DATA FROM A FEDERATED SERVER TO A FEDERATED CLIENT UNTIL SUCH INFORMATION IS NEEDED," filed on same date herewith, by M. W. Huang et al.;

application Ser. No. 09/399,695, entitled "IMPROVED EXTENDED DATA OBJECT ARCHITECTURE FOR HANDLING MULTI-STREAMING AND COMPLEX MULTI-DIMENSIONAL FILES," filed on same date herewith, by Kehsing J. Chou et al.;

application Ser. No. 08/852,062, entitled "CLASS HIERARCHY FOR OBJECT AGGREGATION REPRESENTATION OF RELATIONAL DATABASE ROWS WITH CELLS HAVING NONTRADITIONAL DATATYPES," filed on May 6, 1997, by Daniel T. Chang et al.;

application Ser. No. 08/852,055, entitled "FLEXIBLE OBJECT REPRESENTATION OF RELATIONAL DATABASE CELLS HAVING NONTRADITIONAL DATATYPES," filed on May 6, 1997, by Daniel T. Chang et al.;

application Ser. No. 09/052,678, entitled "MANAGING RESULTS OF FEDERATED SEARCHES ACROSS HETEROGENEOUS DATASTORES WITH A FEDERATED COLLECTION OBJECT," filed on Apr. 1, 1998, by Daniel T. Chang et al.;

application Ser. No. 09/052,680, entitled "FEDERATED SEARCHING OF HETEROGENEOUS DATASTORES USING A FEDERATED DATASTORE OBJECT," filed on Apr. 1, 1998, by Daniel T. Chang et al.; and application Ser. No. 09/052,679, entitled "FEDERATED SEARCHING OF HETEROGENEOUS DATASTORES USING A FEDERATED QUERY OBJECT," filed on Apr. 1, 1998, by Daniel T. Chang et al.;

each of which is incorporated by reference herein.

BACKGROUND OF THE INVENTION

1. Field of the Invention

This invention relates in general to database management systems performed by computers, and in particular, to an architecture and implementation of a dynamic Remote Method Invocation (RMI) server configuration hierarchy to support federated search and update across heterogeneous datastores.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc. . . . are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java.

There is a need in the art for an improved federated system. In particular, there is a need in the art for an architecture and implementation of a dynamic Remote Method Invocation (RMI) server configuration hierarchy to support federated search and update across heterogeneous datastores.

SUMMARY OF THE INVENTION

To overcome the limitations in the prior art described above, and to overcome other limitations that will become apparent upon reading and understanding the present specification, the present invention discloses a method, apparatus, and article of manufacture for an architecture and implementation of a dynamic Remote Method Invocation (RMI) server configuration hierarchy to support federated search and update across heterogeneous datastores.

According to an embodiment of the invention, the RMI server configuration hierarchy supports searching for data in one or more heterogeneous data sources within a computer system. A request for data is received at a federated data source. Then, a server is selected to process the request based on a load of the server and based on whether the server can satisfy the request for data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
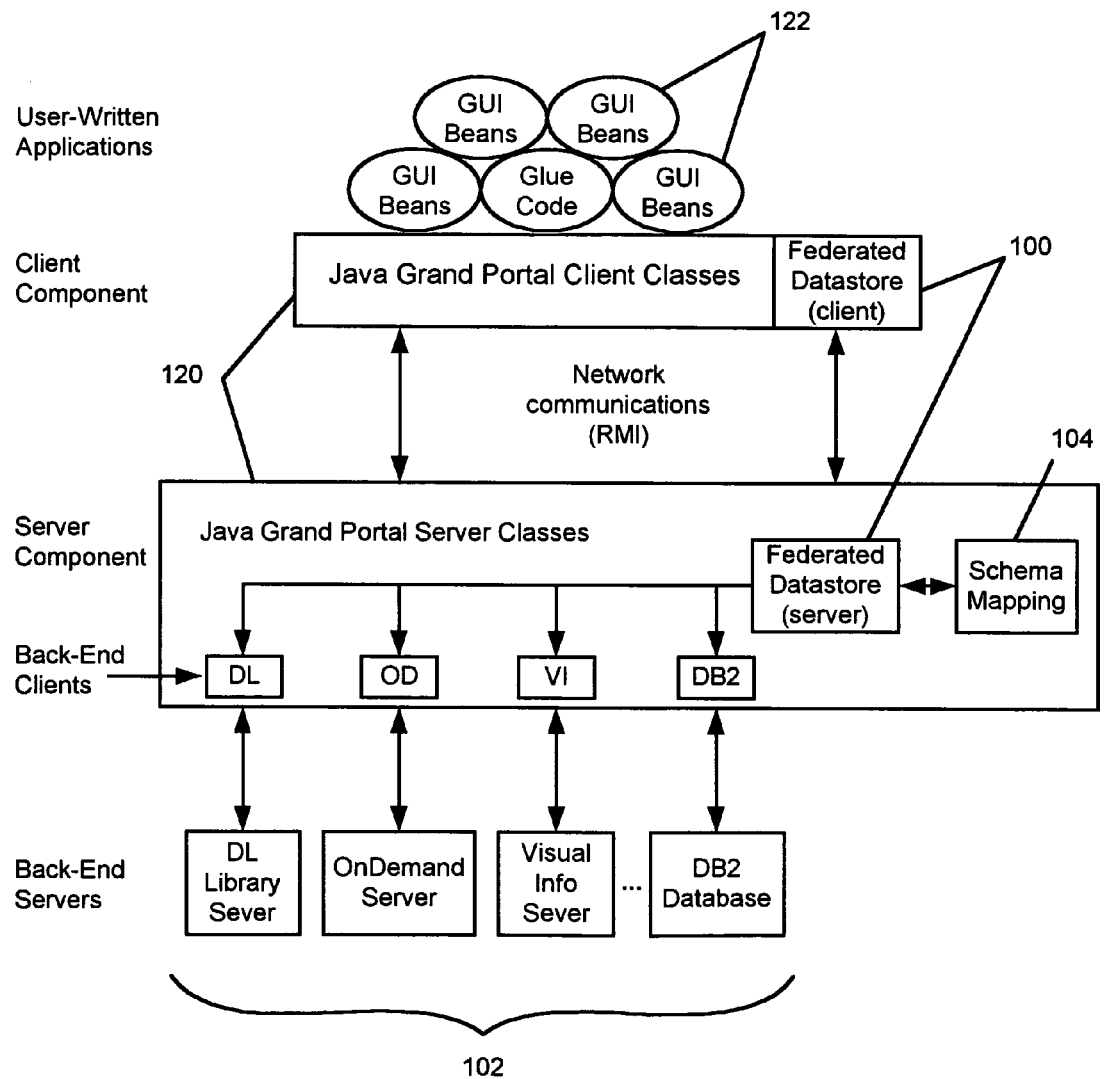
FIG. 1 is a diagram illustrating a computer architecture that could be used in accordance with the present invention.

FIG. 1 is a diagram illustrating a computer architecture that could be used in accordance with the present invention. The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses a Java APIs based on OMG-Object Query Services (OQS) and a Dynamic Data Object protocol, which is a part of OMG/Persistence Object Services.

The Java APIs provide multi-search capabilities such as:
1. Searching within a given datastore using one or a combination of supported query types, i.e.
   Parametric query—Queries requiring an exact match on the condition specified in the query predicate and the data values stored in the datastore.
   Text query—Queries on the content of text fields for approximate match with the given text search expression, e.g. the existence (or non-existence) of certain phrases or word-stems.
   Image query—Queries on the content of image fields for approximate match with the given image search expression, e.g. image with certain degree of similarity based on color percentages, layout, or texture.
2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides an architecture and implementation of a dynamic Remote Method Invocation (RMI) server configuration hierarchy to support federated search and update across heterogeneous datastores. In one embodiment of the invention, one or more classes implement the architecture, and one or more methods are provided to manipulate the dynamic RMI server configuration hierarchy. In one embodiment, the class definitions and methods reside at one or more federated datastores and at one or more RMI servers.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, DB2 etc. Digital Library, OnDemand, VisualInfo, and DB2 are all products from International Business Machines Corporation. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition or super-class. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of a Data Object class. The Data Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
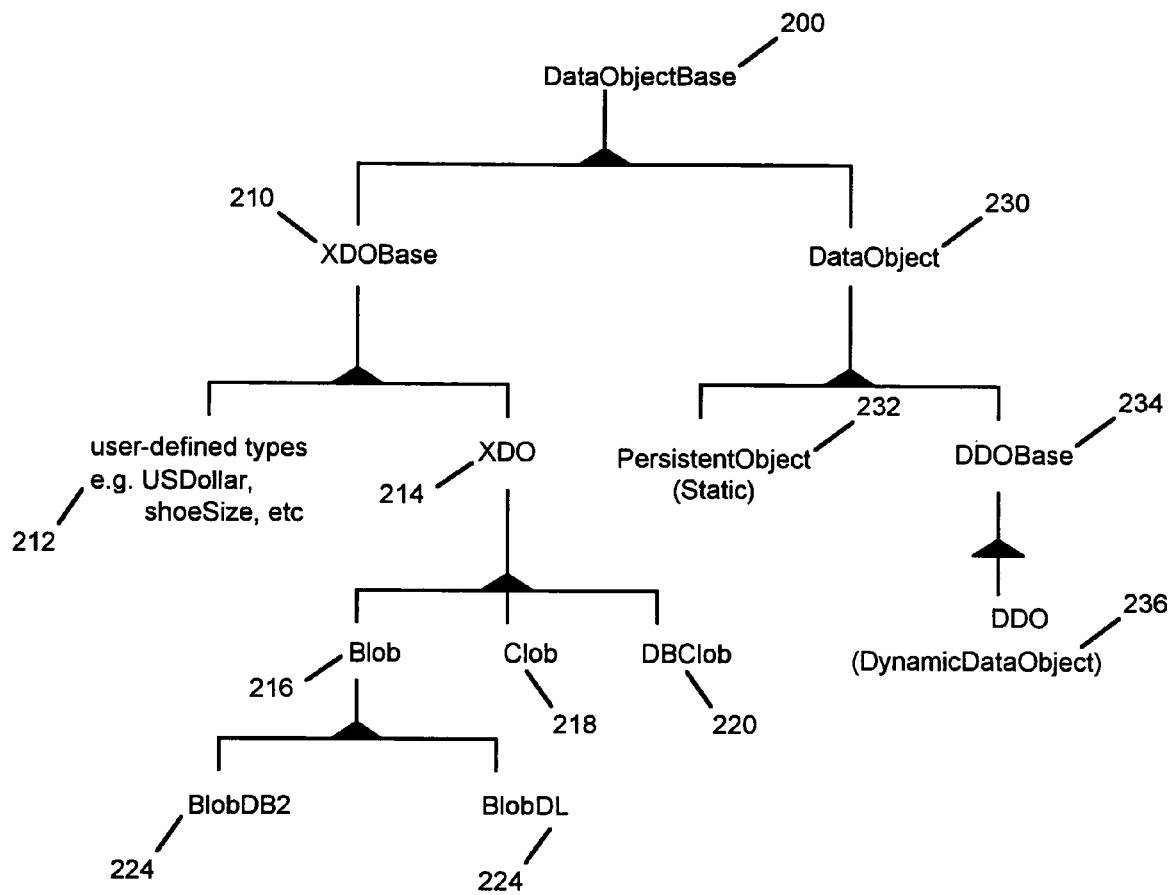
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes.

These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214. A XDO 214 represents complex UDTs or large objects (LOB). This object can exist stand-alone or as a part of a DDO 236. Therefore, it has a persistent object identifier and CRUD operations capabilities.

Blob 216 is a base class for BLOBs as a placeholder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Grand Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datastore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Federated Datastore

Figure 3:
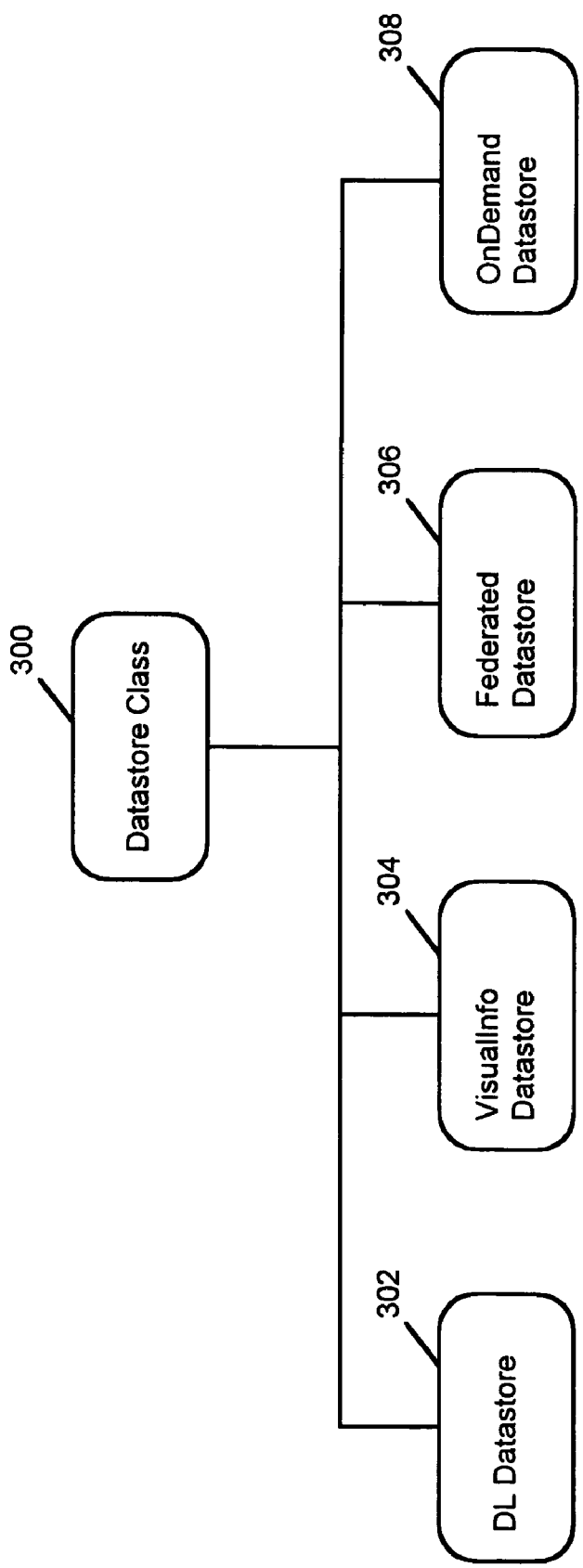
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308. It is to be understood that the techniques of the invention may be applied to any data source and is not limited to the mentioned datastores.

Figure 4:
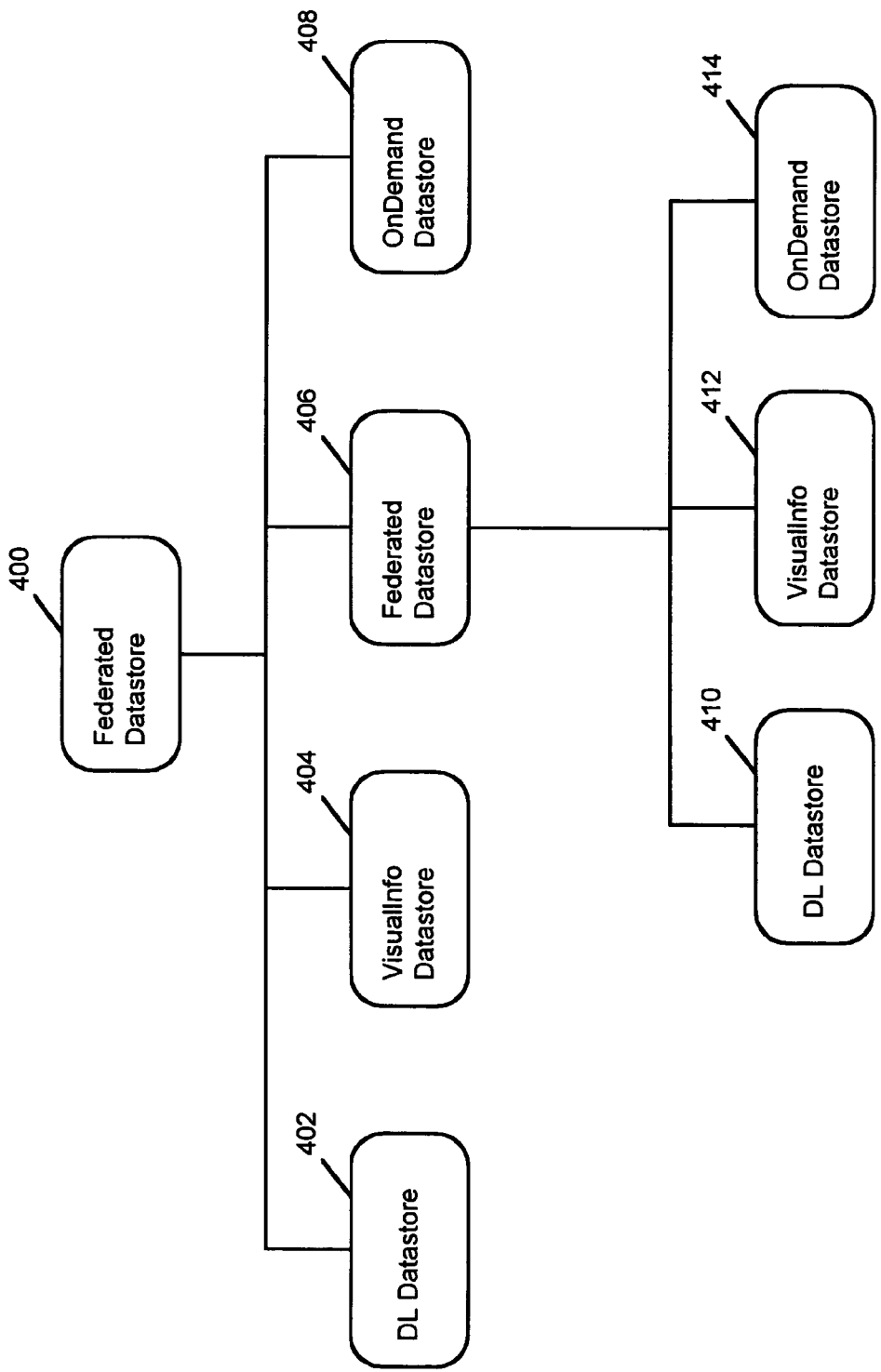
FIG. 4 is a diagram illustrating one composition of a federated datastore.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

*DKDatastoreFed.java*

```
package com.ibm.mm.sdk.server;

public class DKDatastoreFed extends dkAbstractDataStore
        implements DKConstantFed,
                DKConstant,
                DKMessageIdFed,
                DKMessageId,
                dkFederation,
                java.io.Serializable
{
public dkCollection listEntities() throws DKException, Exception
public String[] listEntityNames() throws DKException, Exception
public String[] listTextEntityNames() throws DKException, Exception
public String[] listParmEntityNames() throws DKException, Exception
public dkCollection listEntityAttrs(String entityName) throws DKException, Exception
public String[] listEntityAttrNames(String entityName) throws DKException, Exception
public String registerMapping(DKNVPair sourceMap) throws DKException, Exception
public void unRegisterMapping(String mappingName) throws DKException, Exception
public String[] listMappingNames() throws DKException, Exception
```

```
public dkSchemaMapping getMapping(String mappingName) throws DKException,
        Exception
public synchronized dkExtension getExtension(String extensionName) throws
        DKException, Exception
public synchronized void addExtension(String extensionName,
        dkExtension extensionObj) throws DKException, Exception
public synchronized void removeExtension(String extensionName) throws
        DKException, Exception
public synchronized String[] listExtensionNames() throws DKException, Exception
public DKDDO createDDO(String objectType,
        int Flags) throws DKException, Exception
public dkCollection listSearchTemplates() throws DKException, Exception
public String[] listSearchTemplateNames() throws DKException, Exception
public dkSearchTemplate getSearchTemplate(String templateName) throws
        DKException, Exception
public void destroy() throws DKException, Exception
public synchronized string addRemoveCursor (dkResultSetCursor iCurt int action)
        throws DKException, Exception
public dkDatastore datastoreByServerName (String dsType, String dsName)
        throws DKException, Exception
public void changePassword (String serverName,
        String user Id,
        String oldPwd,
        String newPwd)
        throws DKException, Exception
public void requestConnection (String serverName,
        String userId,
        String passwd,
        String connectString)
        throws DKException, Exception
```

```
public void excludeServer (Sting serverName, String templateName)
        throws DKException, Exception
public boolean isServerExcluded (String serverName, String templateName)
        throws DKException, Exception, java.rmi.RemoteException
public String[] listExcludedServers(String templateName) throws DKException,
        Exception
public void clearExcludedServers(String templateName) throws DKException,
        Exception
};
```

The following methods are part of the federated datastore class:

*public DKDatastoreFed() throws DKException, Exception*

Constructs default Federated Datastore.

*public DKDatastoreFed(String configuration) throws DKException, Exception*

Constructs default Federated Datastore.

*public void connect(String datastore_name,*

*String user_name,*

*String authentication,*

*String connect_string) throws DKException, Exception*

Establishes a connection to a federated datastore.

Parameters:

datastore_name - federated datastore name user_name - userid to logon to this federated datastore authentication - password for this user_name connect_string - additional information string Throws: DKException if either:

datastore_name, user_name, or authentication is null or if error occurs in the federated datastore Overrides:

connect in class dkAbstractDatastore

*public void disconnect() throws DKException, Exception*

Disconnects from the federated datastore.

Throws: DKException if unable to disconnect from server.

Overrides:

disconnect in class dkAbstractDatastore

*public Object getOption(int option) throws DKException*

Gets defined datastore option

Parameters:

option - an option id

Returns:

the value for the given option

Throws: DKException if option is not set

Overrides:

getOption in class dkAbstractDatastore

*public void setOption(int option, Object value) throws DKException*

Sets the given "option" with a specific "value".

Parameters:

option - an option id value - the value for the "option"

Throws: DKException if option/value is invalid

Overrides:

setOption in class dkAbstractDatastore

*public Object evaluate(String command,*

*short commandLangType,*

*DKNVPair params[]) throws DKException, Exception*

Evaluates a query and returns the result as a dkQueryableCollection object.

Parameters:

command - a query string that represent the query criteria commandLangType - a query language type, for Federated, it will be

DK_FEDERATED_QL_TYPE params - a name/value pairs list

Returns:

a query result collection

Throws: DKException if "command" argument is null

Overrides:

evaluate in class dkAbstractDatastore

*public Object evaluate(dkQuery query) throws DKException, Exception*

Evaluates a query and returns the result as a dkQueryableCollection.

Parameters:

query - a given query object

Returns:

a query result collection

Throws: DKException if the "query" input is null or not of federated query type.

Overrides:

evaluate in class dkAbstractDatastore

*public Object evaluate(DKCQExpr qe) throws DKException, Exception*

Evaluates a query.

Parameters:

qe - a common query expression object

Returns:

a collection of the results

Throws: DKException if common query expression object is invalid

Overrides:

evaluate in class dkAbstractDatastore

*public dkResultSetCursor execute(String command,*

*short commandLangType,*

*DKNVPair params[]) throws DKException, Exception*

Executes a command query of the federated datastore and returns a result set cursor.

Parameters:
> command - a query string that represents the query criteria.
> commandLangType - a query language type, for Federated, it will be
> DK_FEDERATED_QL_TYPE.
> params[] - a name/value pairs list.

Returns:
> a dkResultSetCursor object.

Throws: DKException
> if "command" is null or invalid, or "commandLangType" is not Federated
> Query type.

Overrides:
> execute in class dkAbstractDatastore

*public dkResultSetCursor execute(dkQuery query) throws DKException, Exception*

Executes a command query of the federated datastore and returns a result set cursor. This method takes a Federated query object as an argument.

Parameters:
> query - a federated dkQuery object

Returns:
> a dkResultSetCursor object

Throws: DKException
> if "query" object is null or query.qlType() is not
DK_FEDERATED_QL_TYPE Overrides:
> execute in class dkAbstractDatastore

*public dkResultSetCursor execute(DKCQExpr cqe) throws DKException, Exception*

Executes a query expression.

Parameters:

cqe - a common query expression object

Returns:

resultSetCursor which represents a federated datastore cursor.

Throws: DKException if "cqe" object is invalid

Overrides:

execute in class dkAbstractDatastore

*public void executeWithCallback(dkQuery query,*

*dkCallback callbackObj) throws DKException, Exception*

Executes a query with callback function.

Parameters:

query - a query object callbackObj - a dkCallback object

Overrides:

executeWithCallback in class dkAbstractDatastore

*public void executeWithCallback(String command,*

*short commandLangType,*

*DKNVPair params[],*

*dkCallback callbackObj) throws DKException, Exception*

Execute the query with callback function.

Parameters:

command - a query string commandLang - a query type params - additional query option in name/value pair callbackObj - a dkCallback object Overrides:

executeWithCallback in class dkAbstractDatastore

*public void executeWithCallback(DKCQExpr cqe,*

*dkCallback callbackObj) throws DKException, Exception*

Execute a query expression with callback function.

Parameters:

cqe - a common query expression object callbackObj - a dkCallback object

Overrides:

executeWithCallback in class dkAbstractDatastore

*public dkQuery createQuery(String command,*

*short commandLangType,*

*DKNVPair params[]) throws DKException*

Creates a federated query object.

Parameters:

command - a query string that represents the query criteria commandLangType - a query language type, it will be one of the following:

DK_CM_TEMPLATE_QL_TYPE

DK_CM_TEXT_QL_TYPE

DK_CM_IMAGE_QL_TYPE

DK_CM_PARAMETRIC_QL_TYPE

DK_CM_COMBINED_QL_TYPE params[] - a name/value pairs list

Returns:

a federated dkQuery object

Throws: DKException if "command" is null

Overrides:

createQuery in class dkAbstractDatastore

*public dkQuery createQuery(DKCQExpr qe) throws DKException*

Creates a query object.

Parameters:

cqe - a common query expression object

Throws: DKException if "cqe" object is invalid

Overrides:

createQuery in class dkAbstractDatastore

*public dkCollection listDataSources() throws DKException*

List the available datastore sources that a user can connect to.

Returns:

a collection of ServerDef objects describing the servers

Throws: DKException if internal error occurs from server

Overrides:

listDataSources in class dkAbstractDatastore

*public String[] listDataSourceNames() throws DKException*

Gets a list of datasource names.

Returns:

an array of datasource names

Throws: DKException if error occurs when retrieving datasource names

Overrides:

listDataSourceNames in class dkAbstractDatastore

*public void addObject(dkDataObject dataobj) throws DKException, Exception*

Adds a DDO object.

Parameters:

ddo - a Federated object to be added.

Throws: DKException if error occurs during add.

Overrides:

addObject in class dkAbstractDatastore

*public void deleteObject(dkDataObject dataobj) throws DKException, Exception*

Deletes a data object.

Parameters:

>ddo - a federated DDO object to be deleted

Throws: DKException

>if error occurs during delete.

Overrides:

>deleteObject in class dkAbstractDatastore

*public void retrieveObject(dkDataObject dataobj) throws DKException, Exception*

Retrieves a data-object.

Parameters:

>ddo - document object to be retrieved.

Throws: DKException

>when retrieve failed.

Overrides:

>retrieveObject in class dkAbstractDatastore

*public void updateObject(dkDataObject dataobj) throws DKException, Exception*

Updates a data-object.

Parameters:

>ddo - the data-object to be updated.

Throws: DKException

>if error occurs in the datastore

Overrides:

>updateObject in class dkAbstractDatastore

*public void commit() throws DKException*

Commits all activities since the last commit.

Throws: DKException is thrown since federated datastore does not support transaction scope for now.

Overrides:

commit in class dkAbstractDatastore

*public void rollback() throws DKException*

Rolls back all activities since the last commit.

Throws: DKException is thrown since Federated does not support transaction scope for now.

Overrides:

rollback in class dkAbstractDatastore

*public boolean isConnected()*

Checks to see if the datastore is connected

Returns:

true if connected, false otherwise

Overrides:

isConnected in class dkAbstractDatastore

*public DKHandle connection() throws Exception*

Gets the connection handle for the datastore.

Returns:

>the connection handle

Overrides:

>connection in class dkAbstractDatastore

*public DKHandle handle(String type) throws Exception*

>Gets a datastore handle.

Parameters:

>type - type of datastore handle wanted

Returns:

>a datastore handle

Overrides:

>handle in class dkAbstractDatastore

*public String userName()*

>Gets the user name that user used to logon to the datastore.

Returns:

>the userid that user used to logon

Overrides:

>userName in class dkAbstractDatastore

*public String datastoreName() throws Exception*

>Gets the name of this datastore object. Usually it represents a datastore source's server name.

Returns:

datastore name

Overrides:

datastoreName in class dkAbstractDatastore

*public String datastoreType() throws Exception*

Gets the datastore type for this datastore object.

Returns:

datastore type

Overrides:

datastoreType in class dkAbstractDatastore

*public dkDatastoreDef datastoreDef() throws DKException, Exception*

Gets datastore definition.

Returns:

the meta-data (dkDatastoreDef) of this datastore

Overrides:

datastoreDef in class dkAbstractDatastore

*public dkCollection listEntities() throws DKException, Exception*

Gets a list of federated entities from Federated server.

Returns:

a collection of dkEntityDef

Throws: DKException if error occurs

Overrides:

listEntities in class dkAbstractDatastore

*public String[] listEntityNames() throws DKException, Exception*

Gets a list of federated entities names from Federated server.

Returns:

an array of names

Throws: DKException if error occurs

Overrides:

listEntityNames in class dkAbstractDatastore

*public String[] listTextEntityNames() throws DKException, Exception*

Gets a list of federated text search entities names from Federated server.

Returns:

an array of names

Throws: DKException if error occurs

*public String[] listParmEntityNames() throws DKException, Exception*

Gets a list of federated parametric search entities names from Federated server.

Returns:

an array of names

Throws: DKException if error occurs

Overrides:

listEntityAttrs

*public dkCollection listEntityAttrs(String entityName) throws DKException, Exception*

Gets a list of attributes for a given entity name.

Parameters:

entityName - name of entity to retrieve attributes for

Returns:

a dkCollection of dkAttrDef objects

Throws: DKException if the entity name does not exist

Overrides:

listEntityAttrs in class dkAbstractDatastore

*public String[] listEntityAttrNames(String entityName) throws DKException, Exception*

Gets a list of attribute names for a given entity name.

Parameters:

entityName - name of entity to retrieve attribute names for

Returns:

an array of attribute names

Throws: DKException if the entity name does not exist

Overrides:

listEntityAttrNames in class dkAbstractDatastore

*public String registerMapping(DKNVPair sourceMap) throws DKException, Exception*

Registers a mapping definition to this datastore. Mapping is done by entities.

Parameters:

sourceMap - source name and mapping, a DKNVPair class with the following possible values:

("BUFFER", ) : buffer_ref is a reference to a string in memory ("FILE", ) : file_name is the name of the file containing the mapping ("URL", ) : URL-address location of the mapping ("LDAP", ) : LDAP file-name ("SCHEMA", ) : a reference to a dkSchemaMapping object defining the mapping. Currently, only "SCHEMA" option is supported, others may be added later.

Returns:

the name of the mapping definition.

Overrides:

registerMapping in class dkAbstractDatastore

See Also:

unRegisterMapping

*public void unRegisterMapping(String mappingName) throws DKException, Exception*

Unregisters mapping information from this datastore.

Parameters:

mappingName - name of the mapping information

Overrides:

unRegisterMapping in class dkAbstractDatastore

See Also:

registerMapping

*public String[] listMappingNames() throws DKException, Exception*

Gets the list of the registered mappings for this datastore.

Returns:

an array of registered mapping objects' names. The array length would be zero if there is no mapping registered.

Overrides:

listMappingNames in class dkAbstractDatastore

See Also:

registerMapping

*public dkSchemaMapping getMapping(String mappingName) throws DKException, Exception*

Gets mapping information from this datastore.

Parameters:

mappingName - name of the mapping information

Returns:

the schema mapping object

Overrides:

getMapping in class dkAbstractDatastore

See Also:

registerMapping

*public synchronized dkExtension getExtension(String extensionName) throws DKException,*

*Exception*

Gets the extension object from a given extension name.

Parameters:

extensionName - name of the extension object.

Returns:

extension object.

Overrides:

getExtension in class dkAbstractDatastore

*public synchronized void addExtension(String extensionName,*

*dkExtension extensionObj) throws DKException, Exception*

Adds a new extension object.

Parameters:

extensionName - name of new extension object extensionObj - the extension object to be set Overrides:

addExtension in class dkAbstractDatastore

*public synchronized void removeExtension(String extensionName) throws DKException,*

*Exception*

Removes an existing extension object.

Parameters:

extensionName - name of extension object to be removed

Overrides:

removeExtension in class dkAbstractDatastore

*public synchronized String[] listExtensionNames() throws DKException, Exception*

Gets the list of extension objects' names.

Returns:

an array of extension objects' names

Overrides:

listExtensionNames in class dkAbstractDatastore

*public DKDDO createDDO(String objectType,*

*int Flags) throws DKException, Exception*

Creates a new DDO with object type, properties and attributes set for a given back-end server.

Parameters:

objectType - the object type

Flags - to indicate various options and to specify more detailed characteristics of the DDO to create. For example, it may be a directive to create a document DDO, a folder, etc.

Returns:

a new DDO of the given object type with all the properties and attributes set, so that the user only needs to set the attribute values Overrides:

createDDO in class dkAbstractDatastore

*public dkCollection listSearchTemplates() throws DKException, Exception*

Gets a list search templates from a federated server.

Returns:
    a DKSequentialCollection of search templates

Throws: DKException
    if internal datastore error occurs

*public String[] listSearchTemplateNames() throws DKException, Exception*

Gets a list search templates' names from a federated server.

Returns:
    an array of search template names

Throws: DKException
    if internal datastore error occurs

*public dkSearchTemplate getSearchTemplate(String templateName) throws DKException, Exception*

Gets a search template information from a given template name.

Returns:
    dkSearchTemplate object.

Throws: DKException
    if internal datastore error occurs

*public void destroy() throws DKException, Exception* datastore destroy - datastore cleanup if needed

Overrides:

destroy in class dkAbstractDatastore

*public synchronized string addRemoveCursor (dkResultSetCursor iCurt int action)*
  *throws DKException, Exception*

*public dkDatastore datastoreByServerName (String dsType, String dsName)*
  *throws DKException, Exception*

Gets a reference to the specified datastore. The datastore must be connected, otherwise it will return null even if one is found. First, it will look in the free connection pool. If none found, it will look under the connection pool held by active cursors.

*public void changePassword (String serverName,*
  *String user Id,*
  *String oldPwd,*
  *String newPwd)*
  *throws DKException, Exception*

Changes the password of a given user Id for a specified server. Administrator only function.

Parameters:
  userId    - the user-id
  oldPwd    - the old password
  newPwd    -the new password

*public void requestConnection (String serverName,*
  *String userId,*
  *String passwd,*
  *String connectString)*
  *throws DKException, Exception*

Requests a connection to a particular server with the given userid, password & connectString.

Parameters:
  userId    -the user Id
  passwd    -the password connectString - the connect string to logon

*public void excludeServer (Sting serverName, String templateName)*
    *throws DKException, Exception*

Requests the named server to be skipped for the named search template.

Parameters:
    serverName - a back end server name
    templateName - a search template name

*public boolean isServerExcluded (String serverName, String templateName)*
    *throws DKException, Exception, java.rmi.RemoteException*

Checks if the given server is in the excluded list for the named search template.

Parameters:
    serverName        - a back end server name
    templateName - a search template name
Returns:
    true or false

*public String[] listExcludedServers(String templateName) throws DKException, Exception*

Lists all the excluded servers for the named search template

Parameters:
    s - templateName - a search template name
Returns:
    an array of server names that were excluded during search

*public void clearExcludedServers(String templateName) throws DKException, Exception*

Clears all the excluded servers for the named search template

Parameters:
    s - templateName - a search template name

The following is sample syntax of a federated query string. However, it is to be understood that other syntax, including other parameters, may be used for the federated query string without departing from the scope of the invention.

```
PARAMETRIC_SEARCH=([ENTITY=entity_name,]
        [MAX_RESULTS=maximum_results,]
        [COND=(conditional_expression)]
        [; ...]
    );
    [OPTION=([CONTENT=yes_no]
        )]
[and_or TEXT_SEARCH=(COND=(text_search_expression)
    );
    [OPTION=([SEARCH_INDEX={search_index_name | (index_list) };]
        [MAX_RESULTS=maximum_results;]
        [TIME_LIMIT=time_limit]
        )]
]

[and_or

IMAGE_SEARCH=(COND=(image_search_expression)
    );
    [OPTION=([SEARCH_INDEX={search_index_name | (index_list) };]
        [MAX_RESULTS=maximum_results;]
        [TIME_LIMIT=time_limit]
        )]

]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Data filtering. Filters the results to include only the requested data.

Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

```
DKFederatedQuery.java
    package com.ibm.mm.sdk.common.DKFederatedQuery
    public class DKFederatedQuery
        extends Object
        implements dkQuery, DKConstant, DKMessageId, Serializable
    {
    public DKFederatedQuery(dkDatastore creator,
        String queryString)
    public DKFederatedQuery(dkDatastore creator,
    public DKFederatedQuery(DKFederatedQuery fromQuery)
    public void prepare(DKNVPair params[ ]) throws
    DKException, Exception
    public void execute(DKNVPair params[ ]) throws
    DKException, Exception
    public int status( )
    public Object result( ) throws DKException, Exception
    public dkResultSetCursor resultSetCursor( ) throws
    DKException, Exception
    public short qlType( )
    public String queryString( )
    public dkDatastore getDatastore( )
    public void setDatastore(dkDatastore ds) throws
    DKException, Exception
    public String getName( )
    public void setName(String name)
    public int numberOfResults( )
    };
```
The following methods are part of the federated query class:
public DKFederatedQuery(dkDatastore creator,
    String queryString)
    Constructs a Federated query.
    Parameters:
        creator - datastore
        queryString - a query string
public DKFederatedQuery(dkDatastore creator,
    DKCQExpr queryExpr)
    Constructs a Federated query
    Parameters:
        creator - datastore
        queryExpr - a query expression
public DKFederatedQuery(DKFederatedQuery fromQuery)
    Constructs a Federated query from a Federated query object.
    Parameters:
        fromQuery - Federated query
public void prepare(DKNVPair params[ ]) throws
DKException, Exception
    Prepares a query.
    Parameters:
        params - additional prepare query option in name/value pair
public void execute(DKNVPair params[ ]) throws
DKException, Exception
    Executes a query.
    Parameters:
        params - additional query option in name/value pair
public int status( )
    Gets query status.
    Returns:
        query status
public Object result( ) throws DKException, Exception
    Gets query result.
    Returns:
        query result in a DKResults object
public dkResultSetCursor resultSetCursor( ) throws
DKException, Exception
    Gets query result.
    Returns:
        query result in a dkResultSetCursor object
public short qlType( )
    Gets query type.
    Returns:
        query type -continued

```
public String queryString( )
    Gets query string
    Returns:
        query string
public dkDatastore getDatastore( )
    Gets the reference to the owner datastore object.
    Returns:
        the dkDatastore object
public void setDatastore(dkDatastore ds) throws
DKException, Exception
    Sets the reference to the owner datastore object.
    Parameters:
        ds - a datastore
public String getName( )
    Gets query name.
    Returns:
        name of this query
public void setName(String name)
    Sets query name.
    Parameters:
        name - new name to be set to this query object
public int numberOfResults( )
    Gets the number of query results.
    Returns:
        number of query results
```

Schema Mapping

A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100 processes on behalf of its users.

An Architecture and Implementation of a Dynamic RMI Server Configuration Hierarchy to Support Federated Search and Update Across Heterogeneous Datastores An embodiment of the invention provides an architecture and implementation of a dynamic RMI server configuration hierarchy ("RMI architecture") to support federated search and update across heterogeneous datastores. In particular, the RMI architecture enables addition and deletion of RMI servers dynamically. Additionally, the RMI architecture provides load balancing among the RMI servers. Federated systems may be connected to the RMI servers.

The RMI architecture supports a hierarchical grouping of servers on the same or different machines. With the hierarchical grouping, the RMI architecture supports search and update of heterogeneous datastores participating in a federated system, within a client/server environment. In one embodiment, the RMI servers are Java RMI servers. RMI stands for Remote Method Invocation, which identifies a set of protocols developed by Sun Microsystems. The protocols enable Java objects to communicate remotely with other Java objects.

Figure 5:
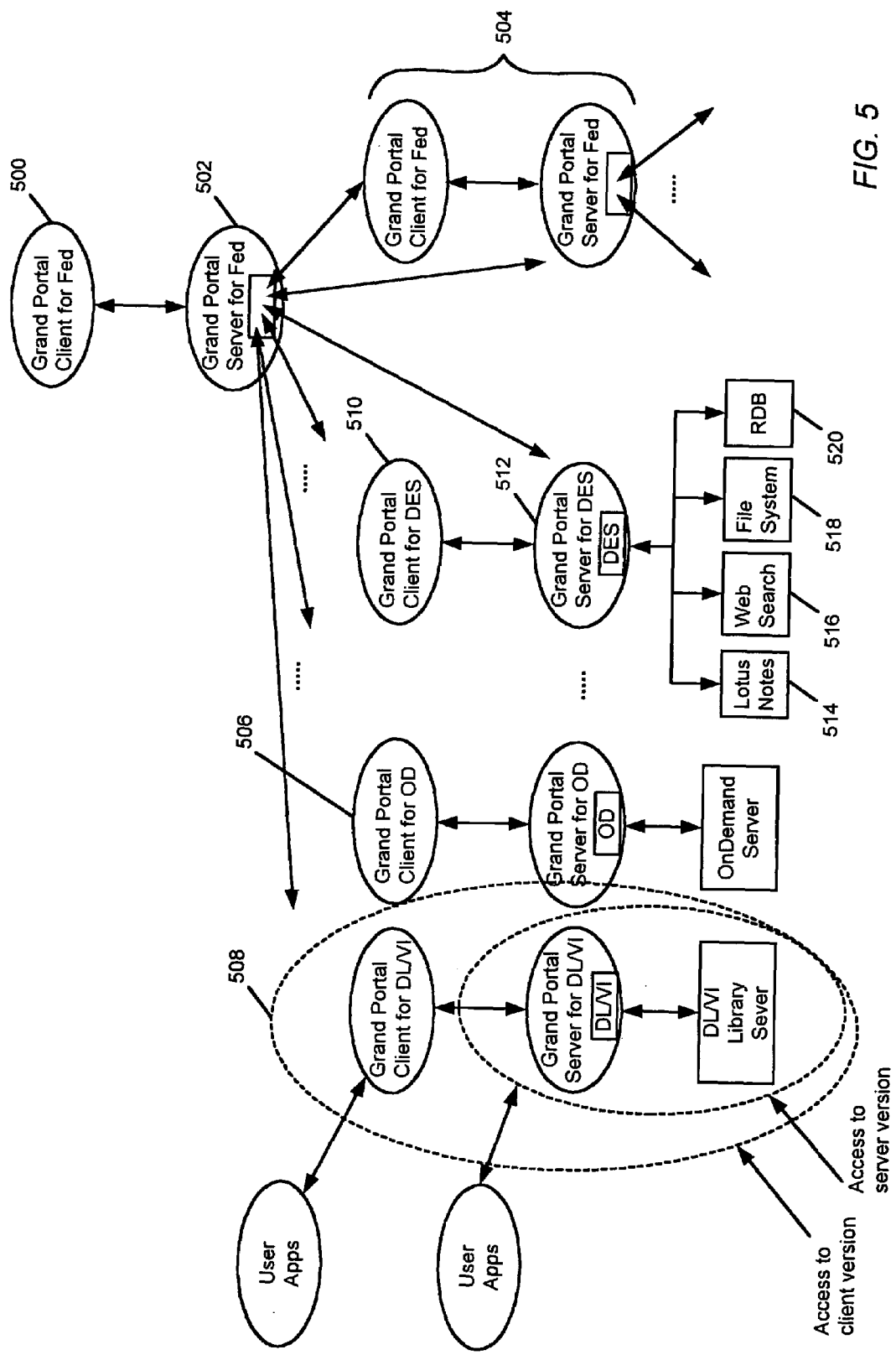
FIG. 5 is a diagram of an extended Grand Portal architecture.

FIG. 5 is a diagram of an extended Grand Portal architecture. A Grand Portal client for a federated client datastore 500 is connected to a Grand Portal server for a federated server datastore 502. Another federated client/server system 504 may be connected to the federated server 502. A Grand Portal client/server system for an OnDemand (OD) datastore 506 may be part of the federation. Additionally, a Grand Portal client/server system for a Digital Library/VisualInfo (DL/VI) datastore 508 may be part of the federation. As with any of the datastores discussed herein, a user may access the client or the server directly. Therefore, user applications may reside at either the client or the server.

A Grand Portal client for a DES datastore 510 or a Grand Portal server for a DES datastore 512 may each be connected to the federation. While the DL/VI datastore enables searching a DL/VI Library server and the OD datastore enables searching of an OnDemand datastore, the DES datastore enables searching of multiple other datastores. In particular, the DES datastore enables searching of a Lotus Notes server 514, a Web 516, a file system 518, and a relational database 520.

Figure 6:
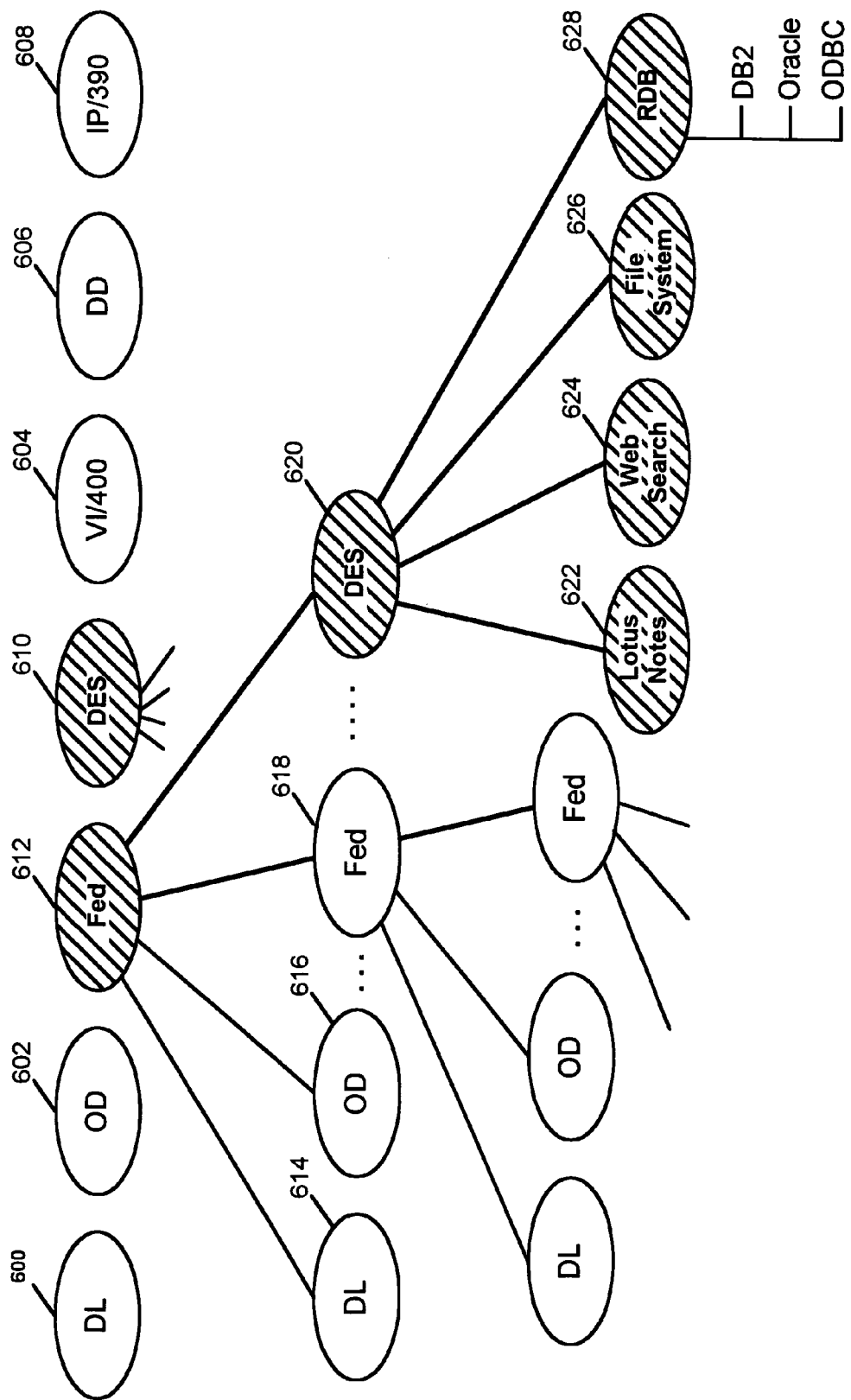
FIG. 6 is a diagram illustrating individual datastores and federated compositions.

FIG. 6 is a diagram illustrating individual datastores and federated compositions. In particular, a datastore can be configured as a stand-alone or as part of a federation. Additionally, a federated datastore can be composed of any number of datastores, including other federated datastores. Stand-alone datastores may be accessed directly by a user. The following are example stand-alone datastores in FIG. 6: a Digital Library (DL) datastore 600, an OnDemand datastore 602, a VisualInfo/400 datastore 604, a Domino.Doc datastore 606, or a ImagePlus/390 datastore 608. Additionally, a DES datastore 610 maybe a stand alone in that it is not part of a federated composition. A federated composition 612 may include individual datastores 614 and 616, another federated datastore 618, and a search gateway to a DES datastore 620. In turn, the DES datastore 620 enables searching a Lotus Notes database 622, searching the Web 624, searching a file system 626, or searching a relational database 628 (e.g., DB2, Oracle, or ODBC).

The RMI architecture allows a user to configure a hierarchical grouping of RMI servers either on several different machines or on the same machine to support federated search and update across several heterogeneous datastores. The architecture allows the creation of a flexible tree of RMI servers in which a new server can be attached or removed dynamically from the configuration. This feature is very advantageous for a federated search environment in a client/server setting where the configuration, the number, and the type of datastores participating in the federation changes dynamically over time.

Figure 7:
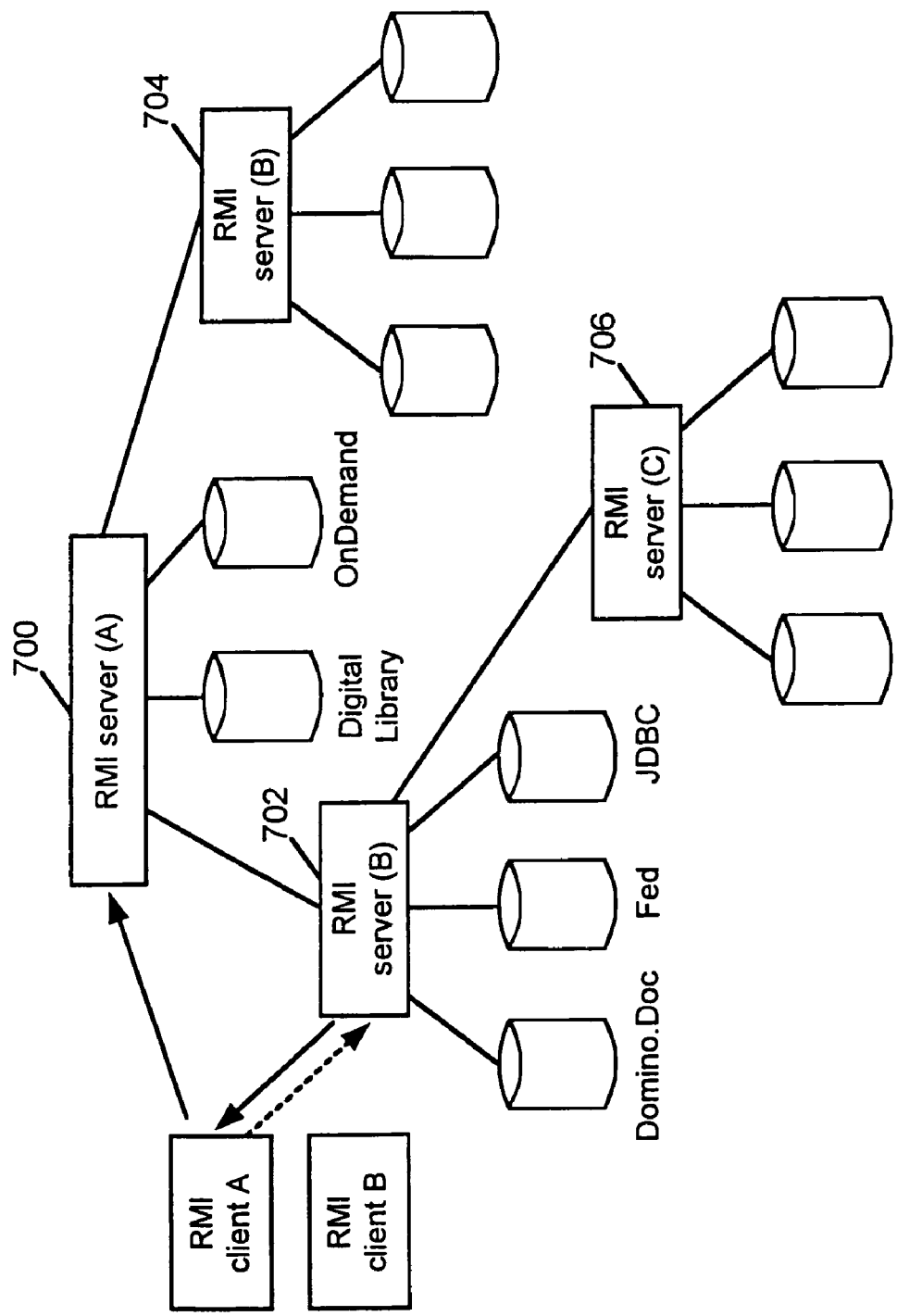
FIG. 7 is a diagram illustrating Remote Method invocation (RMI) client/server hierarchy.

FIG. 7 is a diagram illustrating Remote Method invocation (RMI) client/server hierarchy. An RMI server can connect to an infinite number of datastores, but each server must be connected to at least one datastore. The master RMI server (A) 700 can reference sub-RMI (B) servers 702 and 704 that reside below in the hierarchy. Additionally, another sub-RMI (C) server 706 may be below sub-RMI (B) servers 702 and 704 in the hierarchy.

If an RMI client is searching for the first time for a datastore, the search begins with RMI server (A) 700. If the datastore is not found in RMI server (A) 700, the sub-RMI servers (B and then C) are searched next. If the same RMI client searches for the datastore again, the client searches in the RMI server (A or B or C) where it found the datastore the first time.

That is, the RMI server configuration is initially constructed with a single server supporting one or more federated datastores and/or one or more native datastores. For example, a federated configuration (consisting of a federated datastore and one or more native datastores) and a Digital Library datastore may be connected to a single RMI server. This RMI server is at the top of the RMI server hierarchy and serves as a primary node. Via the RMI server, either the federated configuration or the stand alone Digital Library datastore may be searched.

When a new RMI server is needed, it can be configured in a different machine. This additional machine registers or attaches itself to an existing server in the RMI server hierarchy. In a federated search environment, a text search server (e.g., TextMiner) can be defined and attached to a Digital Library server by specifying its host name and port number. Additional servers can be defined at the same or different machines and attached either to the primary node or any node below it. For example, an image search server QBIC (i.e., Query by Image Content), VisualInfo/400, Image Plus/390, DB2, OnDemand, etc. could be attached to an existing server.

Each RMI server is defined with a server type and a maximum number of connections that it can handle. This information is used by the RMI architecture to perform load balancing and to distribute loads among several servers. The load balancing technique is based on the percentage of the current load and the maximum load of the server. For example, if there are two servers (ServerA and ServerB), assume that ServerA can take 5 loads, while ServerB can take 100 loads. If ServerA is handling 4 loads, while ServerB is handling 20 loads, ServerA is handling a larger percentage of loads for its capability. Therefore, when another request for data is received, ServerB is selected to process the request.

When a federated search request is submitted by a user, the federated datastore will consult the primary node to locate the server with the proper type and allowable loads. Then, the federated datastore will direct the search request to the selected server. Once the server capable of providing the requested service is located, any subsequent requests are automatically directed to the selected server, transparent from the user. This situation is depicted in FIG. 7 by the dotted arrow.

Figure 8:
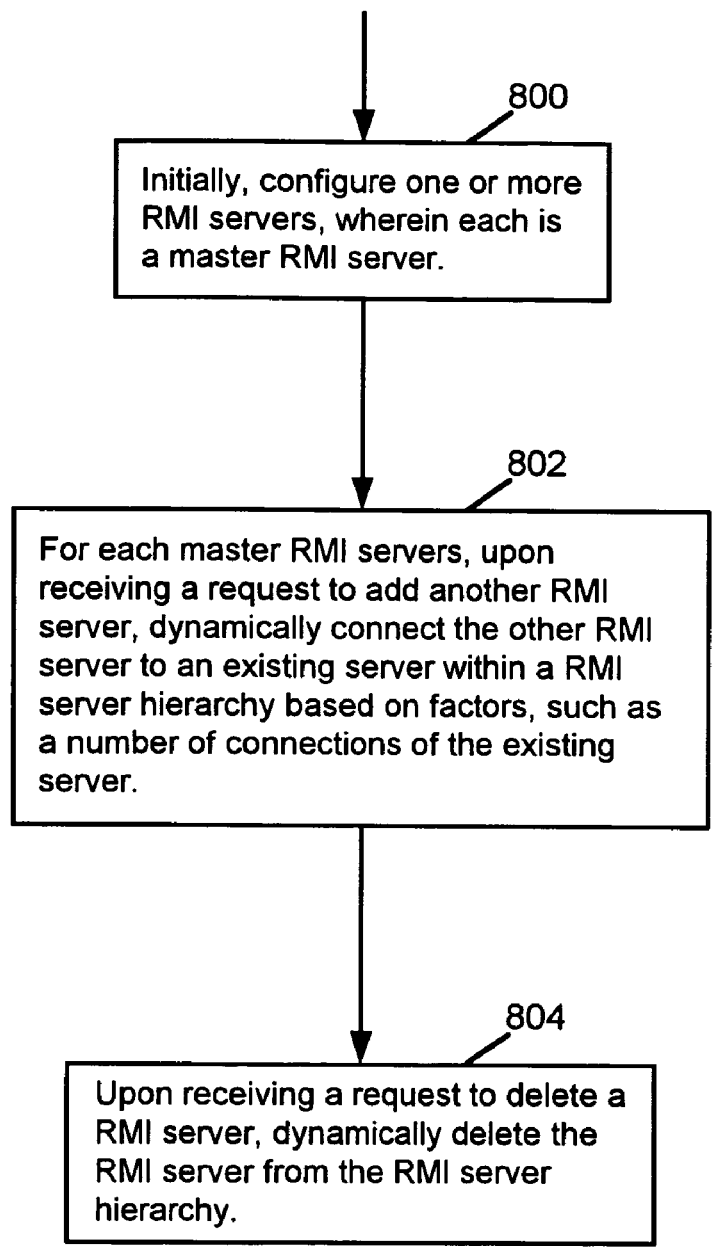
FIG. 8 is a flow diagram of one use of the RMI architecture.

FIG. 8 is a flow diagram of one use of the RMI architecture. In block 800, one or more master RMI servers are initially configured. In block 802, for each master RMI server, upon receiving a request to add another RMI server, the new RMI server is dynamically connected to an existing server within the RMI server hierarchy based on factors, including the number of connections available at the existing server. In block 804, upon receiving a request to delete a RMI server, the RMI server is dynamically deleted from the RMI server hierarchy.

Figure 9:
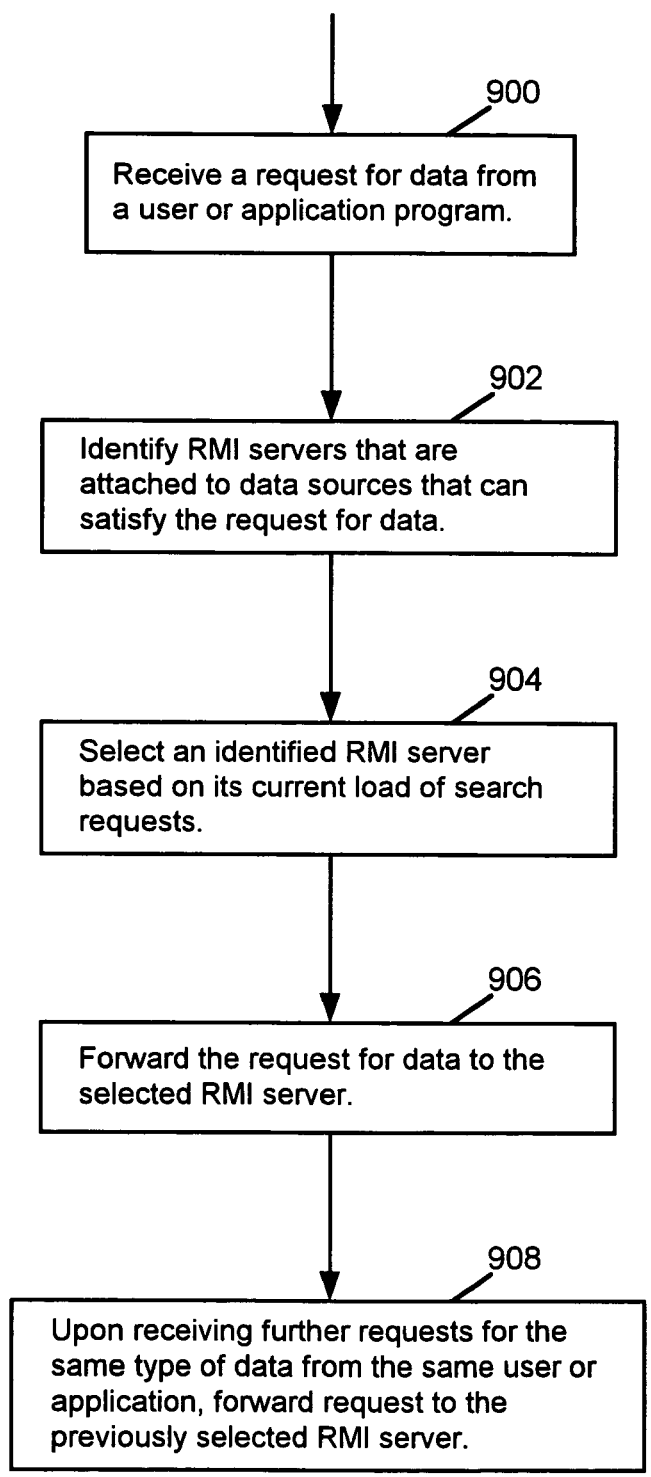
FIG. 9 is a flow diagram illustrating searching within a RMI server hierarchy.

FIG. 9 is a flow diagram illustrating searching within a RMI server hierarchy. Initially, in block 900, a federated datastore receives a request for data from a user or application program. In block 902, the federated datastore identifies RMI servers that are attached to data sources that can satisfy the request for data. In block 904, the federated server selects an identified RMI server based on its current load of search requests. In block 906, the federated datastore selects an identified RMI server based on its current load of search requests, and then the federated datastore forwards the request for data to the selected RMI server. The data source at the selected RMI server processes the request for data. Additionally, in block 908, the federated datastore routes additional requests for that type of data from the same user or application program to that selected RMI server.

When Remote Method Invocation (RMI) is used with content servers, because the client classes in the Java API need to communicate with the server classes to access and manipulate data through the network, both the server and client side should be ready for client/server execution. On the server side, daemon (i.e., a process that runs in the background and performs a particular operation at a specified task or based on a specified event) should be ready to receive a request from a client using a specified port number. On the client side, an application program requires a server name and port number. To communicate between client and server, the port number of the client and server must be same.

To start a daemon on the server side, a script file is used. For example, on Windows NT, a script file called cmbregist.cmd is used, and AIX, a script file called cmbregist.sh is used. Before starting the daemon, the correct port number and server type are defined.

The following table describes the type code used for each server type.

| Server Type | Server Type Code |
|---|---|
| Digital Library and VisualInfo | DL |
| VisualInfo for AS/400 | V4 |
| ImagePlus for OS/390 | IP |

| Server Type | Server Type Code |
|---|---|
| OnDemand | OD |
| Domino.Doc | DD |
| Domino Extended Search | DES |
| Federated Datastore | Fed |

The cmbregist script file starts a daemon for the RMI server (A) 700, in FIG. 7, in Windows NT. The following is an example cmbregist script file.

```
set remotePort=<port#>
jre -cp %CLASSPATH%-ms16M\
    -Djava.rmi.server.codebase=http:// com.ibm.mm.sdk.remote.DKRemoteMainImp\
        %remotePort% <max# of connections> <#of servers> <list of server types>
echo "Regist is over"
```

In the script file, the parameters <port#>, <max # of connections>, <# of servers>, and <server types> are replaced with values. Also, note that there is a space between // and corn. The following is an example:

```
set remotePort=1919
jre -cp %CLASSPATH% -ms16M/
    -Djava.rmi.server.codebase=http:// com.ibm.mm.sdk.remote.DKRemoteMainImp\
        1919 0 3 DD IP DL
echo "Regist is over"
```

If <max # of connections> is zero, then an infinite number of connections can be established to the RMI server from the client.

A different version of cmbregist is used to run a daemon on the server side. In particular, the following sample script starts a daemon for a sub-RMI server (B or C) 702, 704, or 705, in FIG. 7, in Windows NT:

```
set remotePort=<port#>
jre -cp %CLASSPATH% -ms16M\
    -Djava.rmi.server.codebase=http:// com.ibm.mm.sdk.remote.DKRemoteMainImp\
        %remotePort% <#of connections> MasterRMIServer <hostName> <port# of
    MasterRMIServer>\
        <#of servers> <list of server types>
echo "Regist is over"
```

In the script file, the parameters <port#>, <# of connections>, <hostname>, <port# of master RMI server>, <# of servers>, and <server types> are replaced with values. The following is an example:

```
set remotePort=1910
jre -cp %CLASSPATH% -ms16M\
    -Djava.rmi.server.codebase=http:// com.ibm.mm.sdk.remote.DKRemoteMainImp\
        1910 0 MasterRMIServer voodoo 1919 3 Fed DD DL
echo "Regist is over"
```

Note that server names are case sensitive. For example, if an OnDemand datastore is named OD in a script for the master RMI server, it is named OD in the sub-RMI server. After updating a script file, cmbregist is used to run the daemon on the server side.

For AIX, a sample cmbregist.sh script file looks like the following:

```
set remotePort=<port#>
jre -cp $CLASSPATH -ms32M/
    -Djava.rmi.server.codebase=http:// com.ibm.mm.sdk.remote.DKRemoteMainImp\
        $remotePort <max# of connections> <#of servers> <list of server types> &
echo "Regist is over"
```

In the script file, the parameters <port#>, <max # of connections>, <# of servers>, and <server types> are replaced with values. The following is an example:

```
set remotePort=1919
jre -cp $CLASSPATH -ms32M\
    -Djava.rmi.server.codebase=http:// com.ibm.mm.sdk.remote.DKRemoteMainImp\
        1919 0 3 DD IP DL &
echo "Regist is over"
```

The following script will start the daemon for a sub-RMI server in AIX:

```
set remotePort=<port#>
jre -cp $CLASSPATH -ms32M\
    -Djava.rmi.server.codebase=http:// com.ibm.mm.sdk.remote.DKRemoteMainImp\
        $remotePort <#of connections> MasterRMIServer <hostName> <port# of
    MasterRMIServer>\
        <#of servers> <list of server types> &
echo "Regist is over"
```

In the script file, the parameters <port#>, <# of connections>, <hostname>, <port# of master RMI server>, <# of servers>, and <server types> are replaced with values. The following is an example:

```
set remotePort=1910
jre -cp $CLASSPATH-ms32M\
    -Djava.rmi.server.codebase=http:// com.ibm.mm.sdk.remote.DKRemoteMainImp\
        1910 0 MasterRMIServer voodoo 1919 3 Fed DD DL &
echo "Regist is over"
```

The following statements are used to set up the main/primary server (e.g., RMI server (A) 700 in FIG. 7). A script file cmbregis.bat (NT) or script file cmbregist.sh (AIX) may be used.

On NT: jre -cp %classpath% -ms16M -Djava.rmi.server.codebase=http://com.ibm.mm.sdk.remote.DKRemoteMainImp %remotePort% 0 10 DL TS QBIC Fed JDBC V4 IP DD OD DES On AIX: jre -ms32M -cp $CLASSPATH -Djava.rmi.server.codebase=http://com.ibm.mm.sdk.remote.DKRemoteMainImp $remotePort 0 5 TS QBIC DL JDBC Fed The following statements are used to set up secondary servers (i.e., to set up the RMI server hierarchy). To set up another RMI server that points to the RMI server above, a user specifies the following in a copied version of the cmbregist file.

On NT: jre -cp %classpath% -ms16M -Djava.rmi.server.codebase=http://com.ibm.mm.sdk.remote.DKRemoteMainImp %remotePort% 5 MasterRMIServer mach1 1919 1 DL On AIX: jre -ms32M -cp $CLASSPATH -Djava.rmi.server.codebase=http://com.ibm.mm.sdk.remote.DKRemoteMainImp $remotePort 10 MasterRMIServer mach2 1919 3 TS QBIC DL Fed

CONCLUSION

This concludes the description of the preferred embodiment of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for searching for data in one or more heterogeneous data sources within a computer system, the method comprising:

receiving, from a user, a request for data at a federated datastore, wherein the federated datastore comprising a plurality of datastores and at least one of the plurality of datastores is a Domino Extended Search datastore;

selecting one of a plurality of Remote Method Invocation (RMI) servers to process the received request based on the load of the selected RMI server and based on whether the selected RMI server can satisfy the received request for data, said selected RMI server connected to one or more heterogeneous datastores; and providing to the user data corresponding to the received request from the one or more heterogeneous datastores;

wherein the plurality of RMI servers form a server hierarchy;

wherein upon receiving a request to add an additional RMI server, connecting the additional RMI server to an existing RMI server in the server hierarchy based on a number of connections of the existing RMI server; and wherein upon receiving a request to delete an existing RMI server in the hierarchy, deleting that RMI server.

2. The method of claim 1, further comprising forwarding the received request to the selected RMI server.

3. The method of claim 2, further comprising forwarding additional requests for similar data to the selected RMI server.

4. The method of claim 1, wherein the load of the selected RMI server is based on at least the ratio of a current load of the selected RMI server and a maximum load of the selected RMI server.

5. The method according to claim 1, wherein said federated data store comprises a virtual datastore which combines one or more heterogeneous datastores into a consistent and unified conceptual view.

6. The method according to claim 1, wherein said server hierarchy comprises a tree hierarchy.

7. An apparatus for searching for data in one or more heterogeneous data sources, comprising:

a computer system having one or more heterogeneous data sources; and one or more computer programs, performed by the computer system, for receiving a request for data at a federated datastore, wherein the federated datastore comprising a plurality of datastores and at least one of the plurality of datastores is a Domino Extended Search datastore;

selecting one of a plurality of Remote Method Invocation (RMI) servers to process the received request based on the load of the selected RMI server and based on whether the selected RMI server can satisfy the received request for data, said selected RMI server connected to one or more heterogeneous datastores; and providing to the user data corresponding to the received request from the one or more heterogeneous datastores;

wherein the plurality of RMI servers form a server hierarchy;

wherein upon receiving a request to add an additional RMI server, connecting the additional RMI server to an existing RMI server in the server hierarchy based on a number of connections of the existing RMI server; and wherein upon receiving a request to delete an existing RMI server in the hierarchy, deleting that RMI server.

8. The apparatus of claim 7, further comprising forwarding the received request to the selected RMI server.

9. The apparatus of claim 8, further comprising forwarding additional requests for similar data to the selected RMI server.

10. The apparatus of claim 7, wherein the load of the selected RMI server is based on at least the ratio of a current load of the selected RMI server and a maximum load of the selected RMI server.

11. An article of manufacture comprising a program storage medium readable by a computer system and embodying one or more instructions executable by the computer system to perform method steps for searching for data in one or more heterogeneous data sources within a computer system, the method comprising:

receiving, from a user, a request for data at a federated datastore, wherein the federated datastore comprising a plurality of datastores and at least one of the plurality of datastores is a Domino Extended Search datastore;

selecting one of a plurality of Remote Method Invocation (RMI) servers to process the received request based on the load of the selected RMI server and based on whether the selected RMI server can satisfy the received request for data, said selected RMI server connected to one or more heterogeneous datastores; and providing to the user data corresponding to the received request from the one or more heterogeneous datastores;

wherein the plurality of RMI servers form a server hierarchy;

wherein upon receiving a request to add an additional RMI server, connecting the additional RMI server to an existing RMI server in the server hierarchy based on a number of connections of the existing RMI server; and wherein upon receiving a request to delete an existing RMI server in the hierarchy, deleting that RMI server.

12. The article of manufacture of claim 11, further comprising forwarding the received request to the selected RMI server.

13. The article of manufacture of claim 12, further comprising forwarding additional requests for similar data to the selected RMI server.

14. The article of manufacture of claim 11, wherein the load of the selected RMI server is based on at least the ratio of a current load of the selected RMI server and a maximum load of the selected RMI server.

* * * * *